April 2, 1968 L. ROBBINS 3,376,433

MULTI-BRANCH TRANSMISSION LINE SWITCHING SYSTEM
USING THRESHOLD SWITCH DEVICES

Filed April 10, 1964 2 Sheets-Sheet 1

INVENTOR
LIONEL ROBBINS by: Wallenstein, Spangenberg & Hattis
ATTYS.

INVENTOR
LIONEL ROBBINS by: Wallenstein, Spangenberg & Hattis ATTYS.

United States Patent Office 3,376,433
Patented Apr. 2, 1968

3,376,433

MULTI-BRANCH TRANSMISSION LINE SWITCHING SYSTEM USING THRESHOLD SWITCH DEVICES

Lionel Robbins, Oak Park, Mich., assignor, by mesne assignments, to Energy Conversion Devices, Inc., Troy, Mich., a corporation of Delaware Filed Apr. 10, 1964, Ser. No. 358,794
5 Claims. (Cl. 307—242)

ABSTRACT OF THE DISCLOSURE

A transmission line is provided connected to voltage source means providing a selection of voltages of different amplitudes, one or more of the voltages being an A.C. voltage. A number of branch circuits to be respectively selectively responsive to said voltages are connected across the transmission line and each includes a bi-directional threshold semiconductor device in series with a load to be responsive to one of the voltages, each bi-directional semiconductor device comprising a semiconductor material having one condition wherein at least portions thereof between the load terminals have a high resistance where they act as insulators for blocking the flow of current therethrough in either or both directions when the peak value of an applied voltage is below a threshold voltage level which is at or below the peak value of the voltage to which the associated load is to be responsive, and having another condition wherein said at least portions thereof between the load terminals have a low resistance and are conductors of current therethrough substantially equally in either direction therethrough when the peak value of the applied voltage is raised above said threshold voltage level and revert to said one blocking condition when the current therethrough falls below a given holding current level.

The present invention relates to the selective switching of one or more signal sources connected to a transmission line to two or more load circuits connected across the common transmission line, and has its most important utility in transmission line circuits used for transmitting alternating current (A.C.) signals. More specifically, the present invention relates to time sharing of a common transmission line by a number of branch circuits connected in parallel across the line.

The present invention utilizes, as a part thereof, important recent development in bi-directional semiconductor devices, that is devices that can control the flow of current in both possible directions of current flow therethrough. One form of this new development which is utilized in the present invention is referred to as threshold semiconductor device. The threshold semiconductor device is basically a one layer, bi-directional semiconductor device, and thus is inherently a symmetrical operating device which has the same characteristics for both positive and negative voltages applied thereto.

The threshold semiconductor device has a very high resistance (e.g. one to two megohms and higher) under applied voltage conditions of any polarity, a very low resistance (about one ohm or less) when a voltage of any polarity above a given threshold level is applied thereto, the change from the high to the low resistance condition occurring substantially instantaneously, and automatically resets itself substantially instantaneously to its high resistance state when the current therethrough drops below a given holding current level near zero.

Another very important characteristic of the threshold semiconductor device is that the threshold voltage level thereof can be readily varied. For example, by subjecting the various threshold devices to different temperatures or by varying the compositions of the semiconductor material used therein or the surface treatment thereof, the threshold voltage levels can be readily controlled.

In the interest of economy and simplicity, it is often desirable to transmit as much information as possible on a single transmission line. The threshold semiconductor device described above has characteristics which can be used to direct messages on a transmission line selectively to one of more loads, thereby increasing the capacity and utility of the line.

In one form of the invention, two or more loads are connected across a transmission line each through a threshold semiconductor device having a different threshold voltage level. Thus when A.C. or D.C. voltages of different amplitudes are fed along the transmission line from one or more sources of voltage, only those load circuits which have a threshold semiconductor device having a threshold voltage level at or below the peak value of the voltage involved will respond to such voltage.

In another form of the invention, two substantially different voltage sources, which, for example, may be a D.C. and an A.C. voltage source having different magnitudes, can be readily selectively coupled to load circuits coupled across a transmission line so that one load will receive both or the lesser of the voltages and the other load will receive only the higher magnitude voltage. This can be accomplished, for example, by connecting a threshold semiconductor device between the load which is to receive the higher magnitude voltage and the transmission line. The threshold voltage level of the threshold semiconductor device is selected so that it is below the maximum value of the higher magnitude voltage and above the maximum value of the lower magnitude voltage.

For a more complete understanding of the threshold semiconductor device introduced above and to the application thereof in the various transmission line systems described, reference should be made to the specification to follow, the claims and the drawings wherein:

Figure 1:
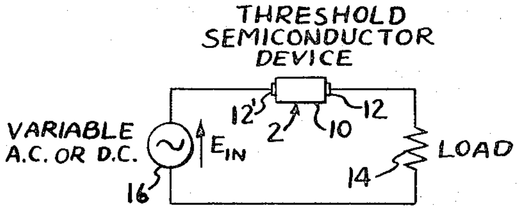
FIG. 1 is a schematic representation of the threshold semiconductor device described above in a circuit including a load and a source of voltage for controlling the load.

For an understanding of the nature and manner of operation of the threshold semiconductor devices referred to above, reference should first be made to FIGS. 1 through 4A of the drawings. In FIG. 1, which illustrates a typical simple load circuit, the threshold semiconductor device 2 used in the present invention has a body 10 which takes a variety of forms, and includes as a surface film or as the entire body 10 or a part thereof, an active bi-directional semiconductor material having very unique and advantageous properties to be described. The body 10 includes a pair of electrodes 12–12′ electrically connecting the same with a load 14 and a source of voltage 16. The source of voltage 16 may be a source of A.C. or D.C. voltage.

The threshold semiconductor device is symmetrical in its operation and contains non-rectifying active solid state semiconductor materials and electrodes in non-rectifying contact therewith for controlling the current flow therethrough substantially equally in either or both directions. In their high resistance or blocking conditions these materials may be crystalline like materials or, preferably, materials of the polymeric type including polymeric networks and the like having covalent bonding and crosslinking highly resistant to crystallization, which are in a locally organized disordered solid state condition which is generally amorphous (not crystalline) but which may possibly contain relatively small crystals or chains or ring segments which would probably be maintained in randomly oriented position therein by the crosslinking. These polymeric structures may be one, two or three dimensional structures. While many different materials may be utilized, for example, these materials can be tellurides, selenides or sulfides or oxides of substantially any metal, or metalloid, or intermetallic compound, or semiconductor or solid solutions or mixtures thereof, particularly good results being obtained where tellurium or selenium are utilized.

It is believed that the cooperating materials (metals, metalloids, intermetallic compounds or semiconductors), which may form compounds, or solid solutions or mixtures with the other materials in the solid state semiconductor materials of this invention, operate, or have a strong tendency to operate, to inhibit crystallization in the semiconductor materials, and it is believed that this crystallization inhibiting tendency is particularly pronounced where the percentages of the materials are relatively remote from the stoichiometric and eutectic ratios of the materials, and/or where the materials themselves have strong crystal inhibiting characteristics, such as, for example, arsenic, gallium and the like. As a result, where, as here, the semiconductor materials have strong crystallization inhibiting characteristics, they will remain or revert to their disordered or generally amorphous state.

The following are specific examples of some of the semiconductor materials which have given satisfactory results in a threshold semiconductor device (the percentages being by weight):

25% arsenic and 75% of a mixture 90% tellurium and 10% germanium; also, with the addition of 5% silicon;
75% tellurium and 25% arsenic;
71.8% tellurium, 14.05% arsenic, 13.06% gallium and the remainder lead sulfide;
72.6% tellurium, 14.2% arsenic and 13.2% gallium;
72.6% tellurium, 27.4% gallium arsenide;
85% tellurium, 12% germanium and 3% silicon;
50% tellurium, 50% gallium;
67.2% tellurium, 25.3% gallium arsenide and 7.5% n-type germanium;
75% tellurium and 25% silicon;
75% tellurium and 25% indium antimonide;
55% tellurium and 45% germanium;
45% tellurium and 55% germanium;
75% selenium and 25% arsenic.

In forming the solid state semiconductor materials of this invention, the materials may be ground in an unglazed porcelain mortar to an even powder consistency and thoroughly mixed. They then may be heated in a sealed quartz tube to above the melting point of the material which has the highest melting point. The molten materials may be cooled in the tube and then broken or cut into pieces, with the pieces ground to proper shape to form the bodies 10, or the molten materials may be cast from the tube into preheated graphite molds to form the bodies. The initial grinding of the materials may be done in the presence of air or in the absence of air, the former being preferable where considerable oxides are desired in the ultimate bodies 10. Alternatively, in forming the bodies 10 it may be desirable to press the mixed powdered materials under pressures up to at least 1000 p.s.i. until the powdered materials are completely compacted, and then the completely compacted materials may be appropriately heated.

In some instances it has been found, particularly where arsenic is present in the bodies 10 formed in the foregoing manner, that the bodies 10 are in a disordered or generally amorphous solid state, the high resistance or blocking state or condition. In such instances, bare electrodes can be and have been embedded in the bodies during the formation thereof, and can be and have been applied to the surfaces thereof, to provide threshold semiconductor devices of this invention wherein the control of the electric current is accomplished in the bulk of the solid state semiconductor materials.

In other instances, it has been found that the bodies 10 formed in the foregoing manner are in a crystalline like solid state, which may be a low resistance or conducting state or condition, probably due to the slow cooling of the semiconductor materials during the formation of the bodies. In these instances, it is necessary to change the bodies or portions thereof or the surfaces thereof to a disordered or generally amorphous state, and this may be accomplished in various ways, as for example: utilizing impure materials, adding impurities; including oxides in the bulk and/or in the surfaces or interfaces; mechanically by machining, sand blasting, impacting, bending, etching or subjecting to ultrasonic waves; metallurgically forming physical lattice deformations by heat treating and quick quenching or by high energy radiation with alpha, beta or gamma rays; chemically by means of oxygen, nitric or hydrofluoric acid, chlorine, sulphur, carbon, gold, nickle, iron or manganese inclusions, or ionic composition inclusions comprising alkali or alkaline earth metal compositions; electrically by electrical pulsing; or combinations thereof.

Where the entire bodies are changed in any of the foregoing manners to a disordered or generally amorphous solid state, bare electrodes may be embedded therein during the formation of the bodies and the current control by such solid state current controlling devices would be in the bulk. Another manner of obtaining current control in the bulk is to embed in the bodies electrodes which, lation, such as an oxide of the electrode material. Current pulses are then applied to the electrodes to cause the effective semiconductor material between the uninsu- except for their tips, are provided with electrical insulated tips of the electrodes to assume the disordered or generally amorphous solid state.

The control of current by the threshold semiconductor devices of this invention can also be accomplished by surfaces or films of the semiconductor materials, particularly good results being here obtained. Here, the bodies of the semiconductor material, which are in a low resistance crystalline like solid state, may have their surfaces treated in the foregoing manners to provide surfaces or films which are in a disordered or generally amorphous solid state. Electrodes are suitably applied to the surfaces or films of such treated bodies, and since the bulk of the bodies is in the crystalline like solid state and the surfaces or films are in a disorganized or generally amorphous state (high resistance or substantially an insulator), the control of the current between the electrodes is mainly accomplished by the surfaces or films.

Instead of forming the complete body 10, the foregoing solid state semiconductor materials may be coated on a suitable smooth substrate, which may be a conductor or an insulator as by vacuum deposition or the like, to provide surfaces or films of the semiconductor material on the substrate which surfaces or films are in a disordered or generally amorphous solid state (high resistance or substantially an insulator). The solid state semiconductor materials normally assume this state probably because of rapid cooling of the materials as they are deposited or they may be readily made to assume this state in the manners described above. Electrodes are suitably applied to the surfaces or films on the substrate and the control of the current is accomplished by the surfaces or films. If the substrate is a conductor, the control of the current is through the surfaces or films between the electrodes and the substrate, and, if desired, the substrate itself may form an electrode. If the substrate is an insulator, the control of the current is along the surfaces or films between the electrodes. A particularly satisfactory device which is extremely accurate and repeatable in production has been produced by vapor depositing on a smooth substrate a thin film of tellurium, arsenic and germanium and by applying tungsten electrodes to the deposited film. The film may be formed by depositing these materials at the same time to provide a uniform and fixed film, or the film may be formed by depositing in sequence layers of tellurium, arsenic, germanium, arsenic and tellurium, and in the latter case, the depositioned layers are then heated to a temperature below the sublimation point of the arsenic to unify and fix the film. The thickness of the surfaces or films, whether formed on the bodies by suitable treatment thereof or by deposition on substrates may be in a range up to a thickness of a few ten-thousandths of an inch or even up to a thickness of a few hundredths of an inch or more.

The electrodes which are utilized in the threshold semiconductor devices used in this invention may be substantantially any good electrical conductor, preferably high melting point materials, such as tantalum, graphite, tungsten, niobium and molybdenum. These electrodes are usually relatively inert with respect to the various aforementioned semiconductor materials.

The electrodes when not embedded in the bodies 10 in the instances discussed above, may be applied to the surfaces or films of bodies, or to the surfaces or films deposited on the substrates in any desired manner, as by mechanically pressing them in place, by fusing them in place, by soldering them in place, by vapor deposition or the like. Preferably, after the electrodes are applied, a pulse of voltage and current is applied to the devices for conditioning and fixing the electrical contact between the electrodes and the semiconductor materials. The current controlling devices may be encapsulated if desired.

It is believed that the generally amorphous polymeric like semiconductor materials have substantial current carrier restraining centers and a relatively large energy gap, that they have a relatively small mean free path for the current carriers, large spatial potential fluctuations and relatively few free current carriers due to the amorphous structure and the current carrier restraining centers therein for providing the high resistance or blocking state or condition. It is also believed that the crystalline like materials in their high resistance or blocking state or condition have substantial current carrier restraining centers, and have a relatively large mean free path for the current carriers due to the crystal lattice structure and hence a relaively high current carrier mobility but that there are relatively few free current carriers due to the substantial current carrier restraining centers therein, a relatively large energy gap therein and large spatial potential fluctuations therein for providing the high resistance or blocking state or condition. It is further believed that the amorphous type semiconductor materials may have a higher resistance at the ordinary and usual temperatures of use, a greater non-linear negative temperature-resistance coefficient, a lower heat conductivity coefficient, and a greater change in electrical conductivity between the blocking state or condition and the conducting state or condition than the crystalline type of semiconductor materials, and thus be more suitable for many applications of this invention. By appropriate selection of materials and dimensions, the high resistance values may be predetermined and they may be made to run into millions of ohms, if desired.

As an electrical field is applied to the semiconductor materials (either the crystalline type or the amorphous type) of a device of this invention in its blocking state or condition, such as a voltage applied to the electrodes, the resistance of at least portions or paths of the semiconductor material between the electrodes decreases gradually and slowly as the applied field increases until such time as the applied field or voltage increases to a threshold value, whereupon said at least portions of the semiconductor material, at least one path between the electrodes, are substantially instantaneously changed to a low resistance or conducting state or condition for conducting current therethrough. It is believed that the applied threshold field or voltage causes firing or breakdown or "switching" of said at least portions or paths of the semiconductor material, and that the breakdown may be electrical or thermal or a combination of both, the electrical breakdown caused by the electrical field or voltage being more pronounced where the distance between the electrodes is small, as small as a fraction of a micron or so, and the thermal breakdown caused by the electrical field or voltage being more pronounced for greater distances between the electrodes. For some crystalline like materials the distances between the electrodes can be so small that barrier rectification and p-n junction operation are impossible due to the distances being beneath the transition length or barrier height. The "switching" time for switching from the blocking state to the conducting state are extremely short, less than a few microseconds.

The electrical breakdown may be due to rapid release, multiplication and conduction of current carriers in avalanche fashion under the influence of the applied electrical field or voltage, which may result from external field emission, internal field emission, impact or collision ionization from current carrier restraining centers (traps, recombination centers or the like), impact or collision ionization from valence bands, much like that occurring at breakdown in a gaseous discharge tube, or by lowering the height or decreasing the width of possible potential barriers and tunneling or the like may also be possible. It is believed that the local organization of the atoms and their spatial relationship in the crystal lattices in the crystalline type materials and the local organization and the spatial relationship between the atoms or small crystals or chain or ring segments in the amorphous type materials, at breakdown, are such as to provide at least a minimum mean free path for the current carriers released by the electrical field or voltage which is sufficient to allow adequate acceleration of the free current carriers by the applied electrical field or voltage to provide the impact or collision ionization and electrical breakdown. It is also believed that such a minimum mean free path for the current carriers may be inherently present in the amorphous structure and that the current conducting condition is greatly dependent upon the local organization for both the amorphous and crystalline conditions. As expressed above a relatively large mean free path for the current carriers can be present in the crystalline structure.

The thermal breakdown may be due to Joule heating of said at least portions or paths of the semiconductor material by the applied electrical field or voltage the semiconductor material having a substantial non-linear negative temperature-resistance coefficient and a minimal heat conductivity coefficient and the resistance of said at least portions or paths of the semiconductor material rapidly decreasing upon such heating thereof. In this respect, it is believed that such decrease in resistance increases the current and rapidly heats by Joule heating said at least portions or paths of the semiconductor material to thermally release the current carriers to be accelerated in the mean free path by the applied electrical field or voltage to provide for rapid release multiplication and conduction of current carriers in avalanche fashion and, hence, breakdown, and, especially in the amorphous condition, the overlapping of orbitals by virtue of the type of local organization can create different sub-bands in the band structure.

It is also believed that the current so initiated between the electrodes at breakdown (electrically, thermally or both) causes at least portions or paths of the semiconductor material between the electrodes to be substantially instantaneously heated by Joule heat, that at such increased temperatures and under the influence of the electrical field or voltage, further current carriers are released, multiplied and conducted in avalanche fashion to provide high current density, and a low resistance or conducting state or condition which remains at a greatly reduced applied voltage. It is possible that the increase in mobility of the current carriers at higher temperature and higher electric field strength is due to the fact that the current carriers being excited to higher energy states populate bands of lower effective mass and, hence, higher mobiliy than at lower temperatures and electric field strengths. The possibility for tunneling increases with lower effective mass and higher mobility. It is also possible that a space charge can be established due to the possibility of the current carriers having different masses and mobilities and since an inhomogeneous electric field could be established which would continuously elevate current carriers from one mobility to another in a regenerative fashion. As the current densities of the devices decrease the current carrier mobilities decrease and, therefore, their capture possibilities increase. In the conducting state or condition the current carriers would be more energetic than their surroundings and would be considered as being hot. It is not clear at what point the minority carriers present could have an influence on the conducting process, but there is a possibility that they may enter and dominate, i.e. become majority carriers at certain critical levels.

It is further believed that the amount of increase in the mean free path for the current carriers in the amorphous like semiconductor material and the increased current carrier mobility are dependent upon the amount of increase in temperature and field strength and it is possible that said at least portions or paths of some of the amorphous like semiconductor materials are electrically activated and heated to at least a critical transition temperature, such as a glass transition temperature, where softening begins to take place. Thus, due to such increase in mean free path for the current carriers, the current carriers produced and released by the applied electrical field or voltage are rapidly released, multiplied and conducted in avalanche fashion under the influence of the applied electrical field or voltage to provide and maintain a low resistance or conducting state or condition.

The voltage across the device in its low resistance or conducting state or condition remains substantially constant although the current may increase and decrease greatly. In this connection, it is believed that the conducting filaments or threads or paths between the electrodes increase and decrease in cross section as the current increases and decreases for providing the substantially constant voltage condition while conducting. When the current through said at least portions or paths of the semiconductor material decreases to a minimum current holding value which is near zero, it is believed that there is insufficient current to maintain the same in their low resistance or conducting state or condition, whereupon they substantially instantaneously change or revert to their high resistance or blocking state or condition. In other words, the conducting filaments or threads or paths between the electrodes are interrupted when this condition occurs. The decrease in current below the minimum current holding value may be brought about by decreasing the applied voltage to a low value. Said at least portions or paths of the semiconductor material may again be substantially instantaneously changed to their low resistance or conducting state or condition where they are again activated by the voltage applied thereto. The ratio of the blocking resistance to the resistance in the conducting state or condition is extremely high, as for example, larger than 100,000:1. In its low resistance or conducting state or condition the resistance may be as low as 1 ohm or less as determined by the small voltage drop thereacross and the holding current for the device may be near zero.

Figure 3:
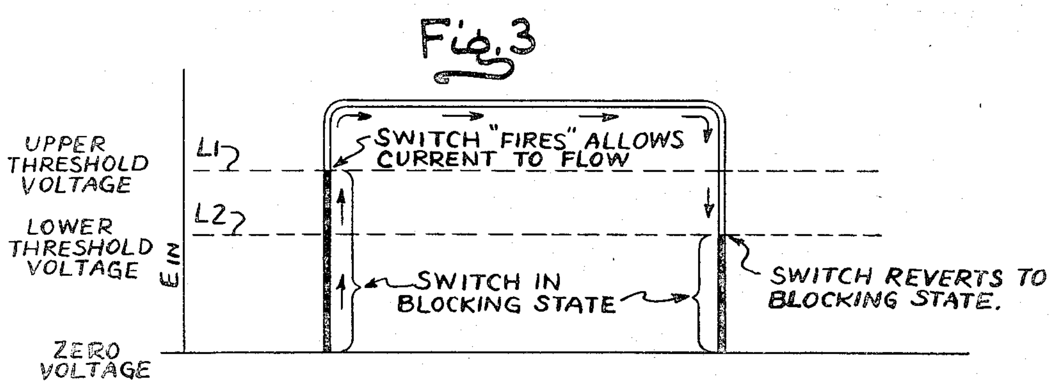
FIG. 3 is a diagram illustrating the operation of the threshold semiconductor device in FIG. 1.
Figure 4:
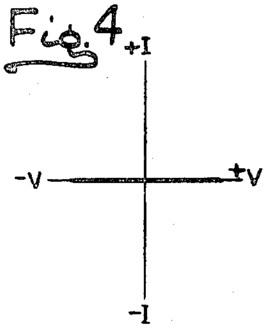
FIGS. 4 and 4A illustrate the voltage-current characteristics for the two operating states of the threshold semiconductor device of FIG. 1 in an A.C. circuit.
Figure 4A:
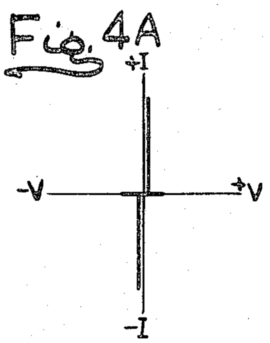

The voltage-current characteristics of the current controlling device are reversible and are generally independent of the load resistance and independent of whether D.C. or A.C. is used. The manner in which the current controlling device operates in a load circuit powered by an A.C. voltage (FIG. 1) is illustrated by the diagram of FIG. 3 and by the voltage-current curves of FIGS. 4 and 4A. When the device 2 is in its high resistance or blocking state or condition and the peak value of the applied A.C. voltage is less than the upper threshold or breakdown voltage value of the device, the device remains in its high resistance or blocking state or condition as indicated in FIGS. 3 and 4. When the peak value of the A.C. applied voltage is raised to the breakdown or upper threshold voltage level L1 shown in FIG. 3, the device fires and causes said at least portions or paths of the semiconductor material to switch or change to the low resistance or conducting state or condition as indicated in FIGS. 3 and 4A. It is noted that the vertical portions of the curve in FIG. 4A are slightly off-set from the zero voltage center point which curve portions represent the small resistance of the device 2 and the small and substantially constant voltage drop thereacross in its low resistance or conducting state or condition. In this condition there is a constant ratio of voltage change to current change in the device 2, the voltage drop thereacross is a minor fraction of the voltage drop across the active semiconductive material of the device in the blocking condition thereof and the low voltage drop thereacross in the conducting condition of the device is the same for increase and decrease in the instantaneous current above the minimum current holding value. It is also noted in FIG. 4A that the device intermittently assumes its high resistance or blocking state or condition each half cycle of the A.C. voltage as the instantaneous voltage nears zero and drops the current below the minimum current holding value, the current being momentarily interrupted during each half cycle. However, following each momentary half cycle interruption of the current flow, the low resistance state or condition of said at least portions or paths of the semiconductor material resumes the next half cycle when the instantaneous value of the applied voltage reaches a certain level L2 in FIG. 3 which is at times substantially below the upper threshold voltage level, especially where the active semiconductor material has any appreciable thickness where heat dissipation is less than ideal. However, other factors than temperature could also possibly be responsible for the presence of a lower threshold voltage level. The semiconductor device is considered to be in its conducting state or condition despite its momentary return to the high resistance state or condition each half cycle. However, when the peak value of the A.C. voltage is decreased below the lower threshold voltage level L2, the low resistance state or condition does not resume each half cycle and the device is then considered to be in a blocking state or condition, this being illustrated in FIGS. 3 and 4. After the device becomes non-conducting, it cannot again become conducting until the peak voltage of the applied A.C. voltage becomes at least as great as the upper threshold voltage level L1 of the device to produce the voltage-current curve of FIG. 4A.

Figure 2:
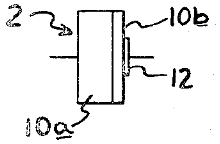
FIGS. 2, 2A and 2B illustrate a few exemplary physical forms of the threshold semiconductor device shown in FIG. 1.
Figure 2A:
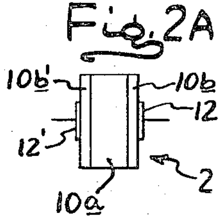
Figure 2B:
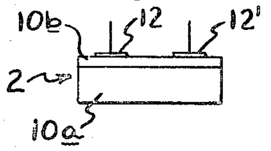

FIGS. 2, 2A and 2B illustrate some exemplary physical forms of the threshold semiconductor device 2. They comprise an inactive and conducting body portion 10*a* of metal or the like or an inactive and conducting semiconductor material and one or more active semiconductor layers or films 10b', made in the manner described above. The electrodes 12 and 12' may comprise separate layers of metal or the like as illustrated in the embodiments of FIGS. 2A and 2B or one of the electrodes 12 may be formed by the conductive body portion 10a as illustrated in the embodiment of FIG. 2.

Figure 5:
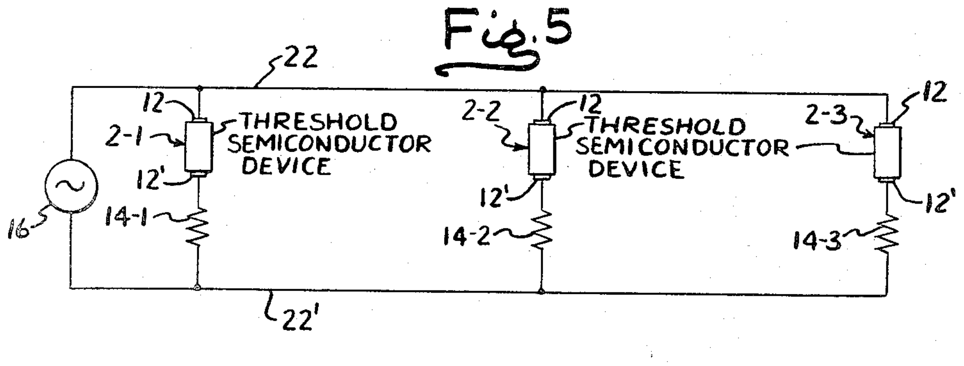
FIG. 5 illustrates one form of transmission line switching system designed in accordance with the present invention.
Figure 6:
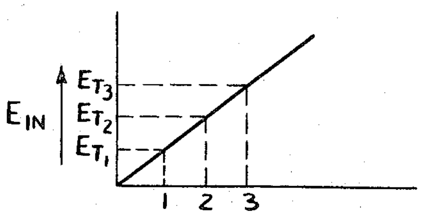
FIG. 6 is a diagram illustrating the different upper threshold voltage levels of the threshold semiconductors devices used with the various loads illustrated in FIG. 5.

Refer now to FIGS. 5 and 6 which illustrate the application of the threshold semiconductor device 2 to a transmission line switching system arranged in accordance with one aspect of the present invention. The transmission line is formed by a pair of conductors 22–22' and a source of A.C. voltage 16 is coupled thereacross. It is assumed that the source of voltage 16 can be adjusted or changed to provide a number of different A.C. voltages having different peak values ET1, ET2 and ET3 identified on the ordinate of the diagram of FIG. 6. Three loads 14–1, 14–2 and 14–3 are respectively connected across the transmission line conductors 22–22' through three different threshold semiconductor devices 2–1, 2–2 and 2–3. These devices respectively have progressively varying upper threshold voltage levels at or below the voltage levels ET1, ET2 and ET3. Thus, when the output of the source of voltage has a peak value ET1 only the threshold semiconductor device 2–1 will be in a state to couple the voltage involved to the associated load 14–1. When the peak value of the output of the source of voltage 16 is at level ET2, the threshold semiconductor devices 2–1 and 2–2 will be in their conductive states and the loads 14–1 and 14–2 will receive the voltage involved. When the peak value of the output of the source of voltage 16 reaches level ET3, all three devices 2–1, 2–2 and 2–3 will be in their conductive states and the associated loads will receive the voltage involved.

Figure 7:
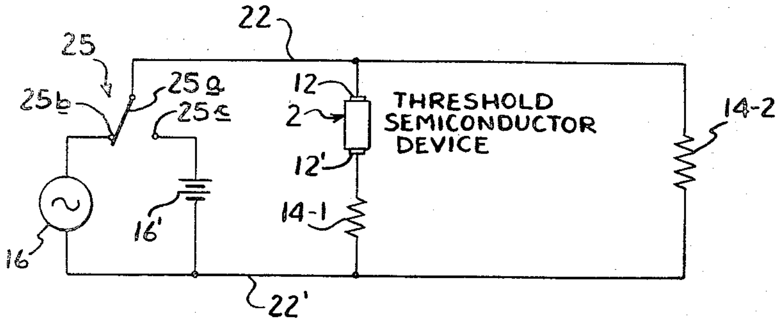
FIG. 7 illustrates another form of the present invention.

Refer now to the embodiment of the invention shown in FIG. 7, where two completely separate voltage sources are indicated, the one being an A.C. voltage source 16 and the other being a D.C. voltage source 16'. In the particular example now being described, it will be assumed that the peak value of the output of the A.C. voltage source 16 is substantially less than the value of the output of the D.C. voltage source 16'. Two load circuits are shown, one including a load 14–1 which is to respond only to the D.C. voltage and the other including a load 14–2 which is to respond only to both the A.C. and D.C. voltages.

A threshold semiconductor device 2 is positioned between the load 14–1 and one of the conductors 22 of the transmission line. The load 14–2 does not have any such threshold semiconductor device used in connection therewith. A switch 25 is provided having a switch arm 25a connected to the conductor 22 and which can be moved into contact with a stationary contact 25b, or a stationary contact 25c. The stationary contact 25b is connected to one of the terminals of the A.C. voltage source 16 and the stationary contact 25c is connected to one of the terminals of the source of D.C. voltage 16'.

The magnitude of the output of the source of D.C. voltage 16' is above the upper threshold voltage level of the threshold semiconductor device 2, and the peak value of the output of the source of A.C. voltage 16 is below the upper threshold voltage level of the threshold semiconductor device 2, and the peak value of the output of the source of A.C. voltage 16 is most advantageously (but not necessarily) also below the lower threshold voltage level of the threshold semiconductor device 2.

It is apparent since the load 14–2 does not have an isolating element connecting it to the transmission line conductors 22 and 22' it will receive both the D.C. and A.C. voltage outputs of the voltage sources 16 and 16'. However, if desired, a capacitor could be positioned in series with the load 14–2 to disconnect the D.C. voltage source from the load 14–2. The output of the A.C. voltage source 16, however, will not appear in the load 14–1, since the peak value thereof is below the upper threshold voltage level of the threshold semiconductor device 2.

It should be understood that numerous modifications may be made of the forms of the invention described above without deviating from the broader aspects thereof.

I claim:

1. A transmission line switching system comprising: a pair of conductors forming a transmission line, voltage source means providing a selection of voltages having various amplitudes on said conductors, a number of branch circuits between said conductors which are to be respectively selectively responsive to said voltages on said conductors, at least some of said branch circuits including a bi-directional semiconductor device having load terminals in series with a load to be responsive to one of said voltages, each of the bi-directional semiconductor devices comprising a semiconductor material having one condition wherein at least portions thereof between the load terminals have a high resistance and where they act as insulators for blocking the flow of current therethrough in either or both directions when the peak value of an applied voltage is below a threshold voltage level which is at or below the peak value of the voltage to which the associated load is to be responsive and being driven substantially instantaneously into another condition wherein said at least portions thereof between the load terminals have a low resistance and are conductors for conducting the flow of current therethrough in either or both directions when the peak value of the applied voltage is raised above said threshold voltage level and revert to said one blocking condition when the current therethrough falls below a given holding current level.

2. A transmission line switching system comprising: a pair of conductors forming a transmission line, a voltage source means providing a selection of A.C. voltages having various amplitudes on said conductors, a number of branch circuits between said conductors which are to be respectively selectively responsive to said A.C. voltages on said conductors, each of said branch circuits including a bi-directional semiconductor device in series with a load to be responsive to one of said voltages, each of the bi-directional semiconductors devices comprising a semiconductor material having one condition wherein at least portions thereof between the load terminals have a high resistance where they act as insulators for blocking the flow of current therethrough in either or both directions when the peak value of an applied voltage is below a threshold voltage level which is at or below the peak value of the voltage to which the associated load is to be responsive and having another condition wherein said at least portions thereof between the load terminals have a low resistance and are conductors for conducting the flow of current therethrough substantially equally in either direction therethrough when the peak value of the applied voltage is raised above said threshold voltage level and revert to said one blocking condition when the current therethrough falls below a given holding current level, the threshold voltage levels of the threshold semiconductor devices of said branch circuits being of progressively increasing value wherein a progressively increasing voltage on said conductors will exceed the threshold voltage levels of the threshold semiconductor devices of a progressively increasing number of branch circuits.

3. A transmission line switching system comprising: a pair of conductors forming a transmission line, a first signal source providing an output voltage and a second signal source providing an output voltage of greater magnitude than the other voltage, means for selectively connecting said voltage sources to said pair of conductors, at least two branch circuits between said conductors each including a load, one of said branch circuits to be responsive to the outputs of at least one of said voltage sources and the other branch circuit to be responsive to a voltage only from said voltage source which has an output having a magnitude greater than the output of the other voltage source, the branch circuit which is to respond to the higher of the outputs of said voltage sources including an isolating bi-directional semiconductor device having load terminals in series with and which isolates the load of the circuit from the transmission line formed by said conductors when in a blocking condition and connects the associated load to the transmission line formed by said conductors when in a conducting condition, said semiconductor device comprising a semiconductor material having one condition wherein at least portions thereof between the load terminals having a high resistance where they act as insulators for blocking the flow of current therethrough substantially equally in either direction therethrough when the peak value of an applied voltage is below a threshold voltage level which is at or below the peak value of the voltage to which the associated load is to be responsive and being driven substantially instantaneously into another condition wherein said at least portions thereof between the load terminals have a low resistance and are substantially conductors for conducting the flow of current therethrough in either or both directions when the peak value of the applied voltage is raised above said threshold voltage level and revert to said one blocking condition when the current therethrough falls below a given holding current level.

4. A transmission line switching system comprising: a pair of conductors forming a transmission line, a D.C. signal source providing a D.C. output voltage and an A.C. signal source providing an A.C. output of voltage, the magnitude of one of said voltages being greater than the magnitude of the other means for selectively connecting said voltage sources to said pair of conductors, at least two branch circuits between said conductors, each including a load, one of said branch circuits to be responsive to the outputs of at least one of said voltage sources and the other branch circuit to be responsive to a voltage only from said voltage source which has an output having a magnitude greater than the output of the other voltage source, the branch circuit which is to respond to the higher of the outputs of said voltage sources including an isolating bi-directional semiconductor device having load terminals in series with and which isolates the load of the circuit from the transmission line formed by said conductors when in a blocking state and connects the associated load to the transmission line formed by said conductors when in a conducting state, said bi-directional semiconductor device comprising a semiconductor material having one condition wherein at least portions thereof between the load terminals have a high resistance where they act as insulators for blocking the flow of current therethrough in either or both directions when the peak value of an applied voltage is below a threshold voltage level which is at or below the peak value of the voltage to which the associated load is to be responsive and being driven substantially instantaneously into another condition wherein said at least portions thereof between the load terminals have a low resistance and are conductors for conducting the flow of current therethrough substantially equally in either direction therethrough when the peak value of the applied voltage is raised above said upper threshold voltage levels remains above a lower threshold voltage level and revert to said one blocking condition when the current therethrough falls below a given holding current level.

5. A transmission line switching system comprising: a pair of conductors forming a transmission line, voltage source means providing a selection of voltages having various amplitudes on said conductors, a number of branch circuits between said conductors which are to be respectively selectively responsive to said voltages on said conductors, at least some of said branch circuits including a bi-directional semiconductor current controlling device in series with a load to be responsive to one of said voltages, each of the bi-directional semiconductor devices comprising a symmetrical bi-directional semiconductor current controlling device including semiconductor material means and two load terminals in non-rectifying contact therewith and coupled in series with the associated load, said semiconductor material means being of one conducting type and including means for providing a first condition of relatively high resistance for substantially blocking current therethrough between the load terminals, said semiconductor material means including means responsive to voltage of at least a threshold value which is at or below the peak value of the voltage to which the associated load is to be responsive applied to said load terminals for altering said first condition of relatively high resistance of said semiconductor material means for substantially instantaneously providing at least one path through said semiconductor material means between the load terminals having a second condition of relatively low resistance for conducting the current therethrough in each direction, said semiconductor material means including means for maintaining said at least one path of said semiconductor material means in its said second relatively low resistance conducting condition providing a substantially constant ratio of voltage change to current change for conducting current at a substantially constant voltage therethrough between the load terminals in either direction therethrough which voltage is the same for increase and decrease in the instantaneous current above a minimum instantaneous current holding value, and providing a voltage drop across said at least one path in its said second relatively low resistance conducting condition which is a minor fraction of the voltage drop across said semiconductor material means in its said first relatively high resistance blocking condition near said threshold voltage value, and said semiconductor material means including means responsive to a decrease in the instantaneous current, through said at least one path in its said relatively low resistance conducting condition, to a value below a minimum instantaneous current holding value for immediately causing realtering of said second relatively low resistance conducting condition of said at least one path to said first relatively high resistance blocking condition for substantially blocking the current therethrough in both directions therethrough.

No references cited.

ARTHUR GAUSS, *Primary Examiner.*

J. D. FREW, *Assistant Examiner.*